United States Patent [19]

Kueny

[11] Patent Number: 4,773,367

[45] Date of Patent: Sep. 27, 1988

[54] INTERNAL COMBUSTION ENGINE WITH IMPROVED BEARING ARRANGEMENT BETWEEN CONNECTING ROD AND CRANKPIN

[75] Inventor: Don F. Kueny, Waukegan, Ill.

[73] Assignee: Outboard Marine Corporation, Waukegan, Ill.

[21] Appl. No.: 72,340

[22] Filed: Jul. 10, 1987

[51] Int. Cl.⁴ .......................... F02B 75/32; F16C 7/00
[52] U.S. Cl. ...................... 123/197 AC; 123/197 AB
[58] Field of Search ................ 123/197 AB, 197 AC, 123/197 R; 384/50, 145, 55, 429, 430; 74/579 E

[56] References Cited

U.S. PATENT DOCUMENTS

| | | | |
|---|---|---|---|
| 2,914,367 | 11/1959 | Underwood | 384/288 |
| 3,625,580 | 12/1971 | DeHart et al. | 384/288 |
| 3,789,743 | 2/1974 | Sihon | 92/187 |
| 3,801,173 | 4/1974 | McKindree | 384/288 |
| 4,073,550 | 2/1978 | Yahraus | 384/288 |
| 4,311,349 | 1/1982 | Roberts | 384/288 |
| 4,383,719 | 5/1983 | Matzelle | 384/282 |
| 4,396,309 | 8/1983 | McCormick | 74/579 E |
| 4,461,585 | 7/1984 | Mahrus et al. | 384/288 |
| 4,488,826 | 12/1984 | Thompson | 384/288 |

FOREIGN PATENT DOCUMENTS 0131383 1/1985 United Kingdom ............... 384/430

Primary Examiner—Willis R. Wolfe
Assistant Examiner—M. Macy
Attorney, Agent, or Firm—Michael, Best & Friedrich

[57] ABSTRACT

An internal combustion engine comprising a cylinder, a piston slidably movable in the cylinder along an axis and relative to a bottom dead center position, a crankshaft including a crankpin having a longitudinal axis and a cylindrical outer surface, a connecting rod including a first end pivotally connected to the piston, and a second end having therein a cylindrical bore rotatably receiving the crankpin, the bore having a cylindrical inner surface radially spaced from the outer surface of the crankpin, one of the inner surface of the connecting rod and the outer surface of the crankpin including a relieved area intersected by a plane having therein the crankpin axis and the piston axis when the piston is in the bottom dead center position, and a plurality of roller bearings located between the outer surface and the inner surface.

20 Claims, 2 Drawing Sheets

INTERNAL COMBUSTION ENGINE WITH IMPROVED BEARING ARRANGEMENT BETWEEN CONNECTING ROD AND CRANKPIN

BACKGROUND OF THE INVENTION

The invention relates to bearing arrangements, and, more particularly, to bearing arrangements for reducing friction between the connecting rod and the crankpin of an internal combustion engine.

Such bearing arrangements, which typically include roller bearings located between the crankpin and the connecting rod, sometimes cause crankpin spalling. Spalling occurs because the load from the connecting rod is most highly concentrated on the uppermost bearing, i.e., the bearing closest to the piston. This load concentration is repeatedly transmitted to the crankpin, and the cyclical stress on the crankpin results in spalling of the crankpin.

Spalling can occur either on the outside of the crankpin (caused by combustion loading when the piston is in the top dead center position) or on the inside of the crankpin (caused by inertia loading when the piston is in the bottom dead center position). Spalling on the inside of the crankpin due to inertia loading is most common in modern, high rpm engines.

Attention is directed to the following U.S. patents:

| | | |
|---|---|---|
| Underwood | 2,914,367 | Nov. 24, 1959 |
| DeHart, et al. | 3,625,580 | Dec. 7, 1971 |
| Sihon | 3,789,743 | Feb. 5, 1974 |
| McKindree | 3,801,173 | Apr. 2, 1974 |
| Yahraus | 4,073,550 | Feb. 14, 1978 |
| Matzelle | 4,383,719 | May 17, 1983 |
| Roberts | 4,311,349 | Jan. 19, 1982 |
| Mahrus, et al. | 4,461,585 | Jul. 24, 1984 |
| Thompson | 4,488,826 | Dec. 18, 1984 |

SUMMARY OF THE INVENTION

The invention provides an internal combustion engine comprising a cylinder, a piston slidably movable in the cylinder along an axis and relative to a bottom dead center position, a crankshaft including a crankpin having a longitudinal axis and a cylindrical outer surface, a connecting rod including a first end pivotally connected to the piston, and a second end having therein a cylindrical bore rotatably receiving the crankpin, the bore having a cylindrical inner surface radially spaced from the outer surface of the crankpin, one of the inner surface of the connecting rod and the outer surface of the crankpin including a relieved area intersected by a plane having therein the crankpin axis and the piston axis when the piston is in the bottom dead center position, and a plurality of roller bearings located between the outer surface and the inner surface.

In one embodiment, the outer surface of the crankpin includes the relieved area.

In one embodiment, the outer surface includes a portion which is closest to the piston when the piston is in the bottom dead center position, and the relieved area is located on the portion of the outer surface.

In one embodiment, the outer surface includes a portion which is farthest from the piston when the piston is in the bottom dead center position, and the relieved area is located on the portion of the outer surface.

In one embodiment, the inner surface of the connecting rod includes the relieved area.

In one embodiment, the inner surface includes a portion which is located closest to the piston, and the relieved area is located on the portion of the inner surface.

In one embodiment, the relieved area has an arcuate extent of approximately 60 degrees.

In one embodiment, the engine comprises approximately 18 roller bearings located between the inner surface and the outer surface.

In one embodiment, the inner and outer surfaces define an annular space, the space includes an arcuate portion partially defined by the relieved area and having a first radial dimension, and the remainder of the space has a second radial dimension approximately 0.0002 inches less than the first radial dimension.

The invention also provides an internal combustion engine comprising a cylinder, a piston slidably movable in the cylinder along an axis and relative to a bottom dead center position, a crankshaft including a crankpin having a longitudinal axis and a generally cylindrical outer surface, a connecting rod including a first end pivotally connected to the piston, and a second end having therein a cylindrical bore rotatably receiving the crankpin, the bore having a generally cylindrical inner surface radially spaced from the outer surface to define an annular space between the inner and outer surfaces, the annular space including an arcuate portion intersected by a plane having therein the crankpin axis and the piston axis when the piston is in the bottom dead center position, the arcuate portion having a first radial dimension, and the remainder of the space having a second radial dimension less than the first radial dimension and a plurality of roller bearings located in the space.

In one embodiment, the annular space includes a portion which is closest to the piston when the piston is in the bottom dead center position, and the arcuate portion is the closest portion.

In one embodiment, the piston is also movable relative to a top dead center position, the annular space includes a portion which is closest to the piston when the piston is in the top dead center position, and the arcuate portion is the closest portion.

In one embodiment, the arcuate portion is partially defined by a relieved area on the outer surface.

In one embodiment, the arcuate portion is partially defined by a relieved area on the inner surface.

A principal feature of the invention is the provision of an internal combustion engine comprising a crankpin having a longitudinal axis and a cylindrical outer surface, and a connecting rod including an end having therein a cylindrical bore rotatably receiving the crankpin, the bore having a cylindrical inner surface radially spaced from the outer surface of the crankpin, and one of the inner surface and the outer surface including a relieved area intersected by a plane having therein a crankpin axis and a piston axis when the piston is in the bottom dead center position. The relieved area can be located on one or more of the inside of the crankpin, the outside of the crankpin, or the top of the connecting rod bore. The relieved area causes some of the load on the connecting rod to be transferred from the uppermost bearing or bearings to the immediately surrounding bearings, thereby more evenly distributing the load.

Other features and advantages of the invention will become apparent to those skilled in the art upon review of the following detailed description, claims, and drawings.

Figure 1:
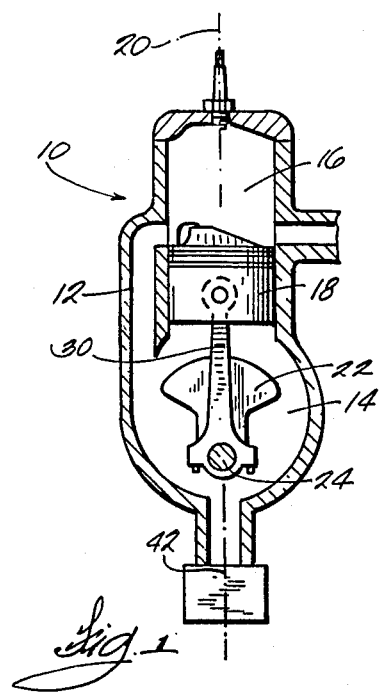
FIG. 1 is a side elevational view, partially in cross section, of an internal combustion engine embodying the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

An internal combustion engine 10 which embodies the invention is illustrated in the drawings. While the illustrated engine 10 is a conventional two-cycle engine, it should be understood that the invention is also applicable to four-cycle engines.

Figure 2:
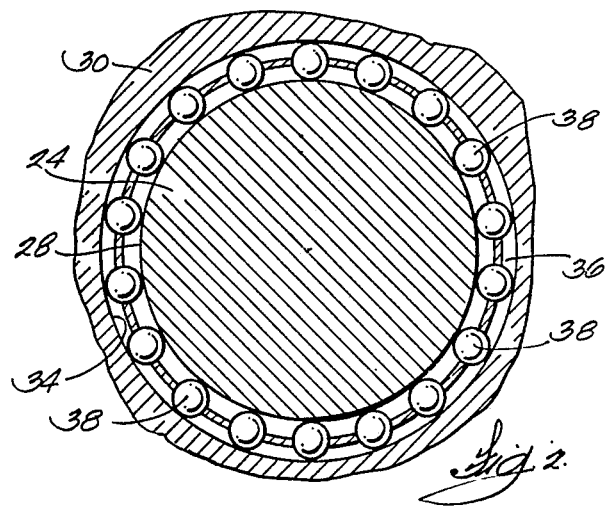
FIG. 2 is an enlarged cross sectional view of the bearing arrangement between the crankpin and the connecting rod.

As shown in FIG. 1, the engine 10 comprises an engine block 12 defining a crankcase 14 and a cylinder 16, and a piston 18 slidably movable in the cylinder 16 along an axis 20 and relative to a bottom dead center position (shown in FIG. 1) and a top dead center position (not shown). The engine 10 also comprises a crankshaft 22 rotatably supported in the crankcase 14 and including a crankpin 24 having a longitudinal axis 26 (FIGS. 3 and 7) and a cylindrical outer surface 28. The engine 10 further comprises a connecting rod 30 including a first or upper end pivotally connected to the piston 18, and a second or lower end having therein a cylindrical bore 32 (FIG. 6) rotatably receiving the crankpin 24. The connecting rod bore 32 has a cylindrical inner surface 34 radially spaced from the crankpin outer surface 28 to define an annular space 36 (FIGS. 2, 4 and 5), and the engine 10 further comprises a plurality of roller bearings 38 located in the space 36, i.e., between the crankpin outer surface 28 and the connecting rod inner surface 34. The roller bearings 38 have a diameter equal to the radial distance between the inner and outer surfaces 34 and 28, respectively. In the illustrated construction, as shown in FIG. 2, the engine 10 includes eighteen roller bearings located in the space 36.

In order to reduce crankpin spalling, in the preferred embodiment, the crankpin outer surface 28 includes (see FIGS. 3–5) a relieved area 40 intersected by a plane 42 (FIGS. 1 and 4) having therein the crankpin axis 26 and the piston axis 20 when the piston 18 is in the bottom dead center position. In the illustrated construction, the relieved area 40 is generally bisected by the plane 42 and is located on the inside of the crankpin outer surface 28, i.e., on the portion of the crankpin outer surface 28 which is closest to the piston 18 when the piston 18 is in the bottom dead center position. As explained below, this location reduces crankpin spalling caused by inertia loading of the crankpin 24.

Alternatively stated, the annular space 36 between the crankpin outer surface 28 and the connecting rod inner surface 34 includes (see FIG. 4) an arcuate portion 44 which is intersected by the above-mentioned plane 42, which is partially defined by the relieved area 40, and which has a first radial dimension "A". The remainder of the annular space 36 has a second radial dimension "B" which is less than the first radial dimension "A". In the preferred embodiment, wherein the relieved area 40 is located on the inside of the crankpin outer surface 28, the radially inner boundary of the arcuate portion 44 coincides with the relieved area 40, and the arcuate portion 44 is generally bisected by the plane 42. Also, the arcuate portion 44 of the annular space 36 is the portion of the annular space 36 that is closest to the piston 18 when the piston 18 is in the bottom dead center position.

Furthermore, in the preferred embodiment, the relieved area 40, and thus the arcuate portion 44, has an arcuate extent of approximately 60 degrees, and the relieved area 40 has a depth or relief such that the second radial dimension "B" is 0.0002 inches less than the first radial dimension "A".

Figure 5:
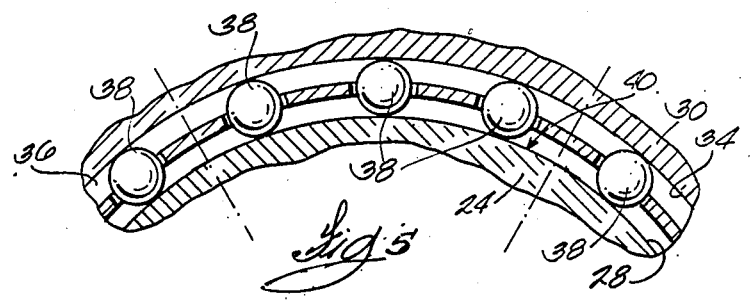
FIG. 5 is a view similar to FIG. 4 showing the bearing arrangement loaded.
Figure 4:
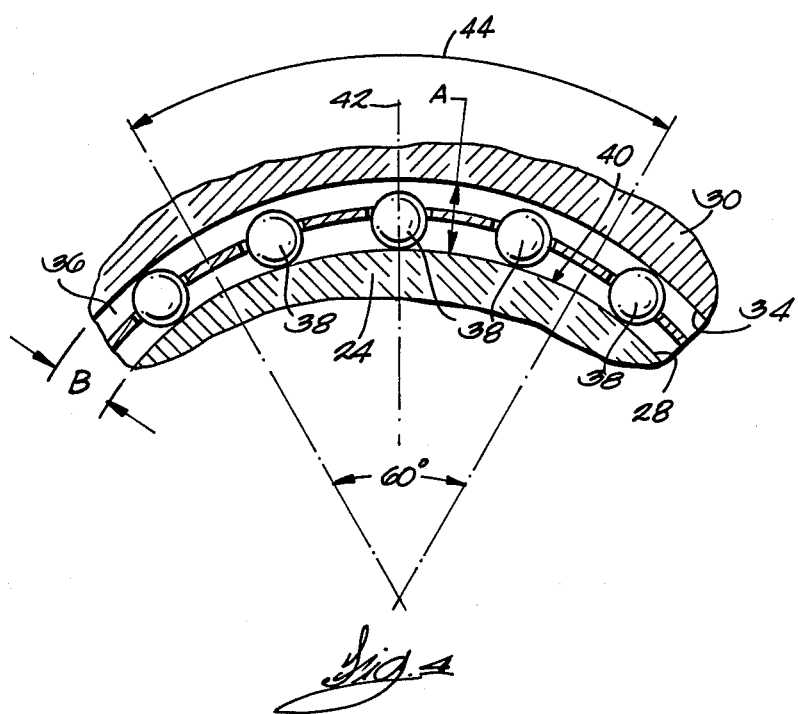
FIG. 4 is an enlarged portion of FIG. 2 showing an exaggerated relieved area on the crankpin and showing the bearing arrangement unloaded.

The effect of the relieved area 40 is illustrated in FIGS. 4 and 5, which illustrate the arcuate portion 44 of the annular space 36. FIG. 4 shows the arcuate portion 44 when the piston 18 is in the bottom dead center position and at rest, so that the connecting rod 30 is not loaded and the bearings 38 within the arcuate portion 44 are spaced from the inner surface 34 of the connecting rod 30. FIG. 5 shows the arcuate portion 44 when the piston 18 is in the bottom dead center position and the engine 10 is operating, so that the connecting rod 30 is loaded by the inertia of the piston 18 and, as explained below, the bearings 38 within the arcuate portion are in contact with the inner surface 34 of the connecting rod 30.

As shown in FIG. 4, when the connecting rod 30 is not loaded, the first radial dimension "A" is 0.0002 inches greater than the diameter of the roller bearings 38. Accordingly, there is a space of 0.0002 inches between each of the three roller bearings 38 within the arcuate portion 44 and the inner surface 34 of the connecting rod 30. Therefore, when a downward, inertial force is applied to the connecting rod 30, that force is not immediately transmitted to the crankpin 24 by the three roller bearings 38 within the arcuate portion 44. Instead, that force is transmitted only by the surrounding roller bearings 38, e.g., the end roller bearings 38 in FIG. 4, because these roller bearings 38 are in contact with both the connecting rod inner surface 34 and the crankpin outer surface 28. However, momentarily after the force is initially transmitted to the crankpin 24 by the surrounding roller bearings 38, the surrounding roller bearings 38, the crankpin outer surface 28 and the connecting rod inner surface 34 deflect and permit downward movement of the connecting rod inner surface 34 relative to the crankpin outer surface 28 so that the connecting rod inner surface 34 contacts the roller bearings 38 within the arcuate portion 44, as shown in FIG. 5. Thereafter, some of the downward force on the connecting rod 30 is transmitted to the crankpin 24 by the roller bearings 38 within the arcuate portion 44, but the force transmitted by each of these roller bearings 38 is not as great as it would be without the relieved area 40. Instead, the total load is more evenly distributed over all of the bearings 38 on the upper half of the crankpin 24. This reduces high stress concentrations on the crankpin outer surface 28 and thereby reduces spalling. In the preferred embodiment, the five roller bearings 38 illustrated in FIG. 5 transmit substantially equal forces.

Figure 6:
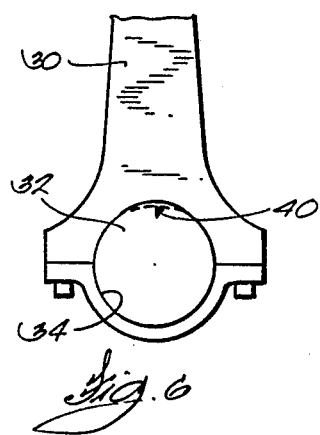
FIG. 6 is a view enlarged with respect to FIG. 1 and reduced with respect to FIG. 2 and showing an exaggerated relieved area in the connecting rod.

An alternative embodiment of the invention is illustrated in FIG. 6. In the alternative embodiment, the relieved area is located on the connecting rod inner surface 34 rather than on the crankpin outer surface 28. More particularly, the relieved area 40 is located on the portion of the inner surface 34 which is closest to the piston 18 when the piston 18 is in the bottom dead center position. Therefore, the arcuate portion 44 of the annular space 36 is the portion that is closest to the piston 18 when the piston 18 is in the bottom dead center position, and is also the portion of the annular space 36 that is closest to the piston 18 when the piston 18 is in the top dead center position. While this construction is not as easy to manufacture as the construction of the preferred embodiment, it has the advantage of reducing both spalling on the inside of the crankpin 24 due to inertia loading and spalling on the outside of the crankpin 24 due to combustion loading.

Figure 7:
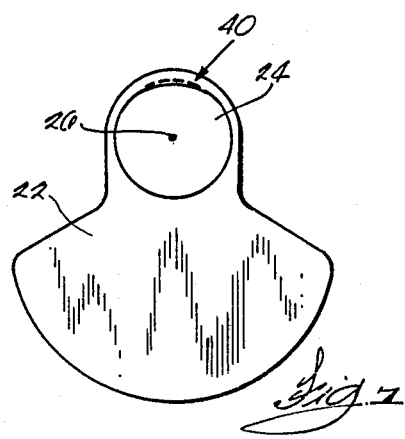
FIG. 7 is a view similar to FIG. 3 showing an exaggerated relieved area on the crankpin.

A second alternative embodiment of the invention is illustrated in FIG. 7. In the second alternative embodiment, the relieved area 40 is also located on the outer surface 28 of the crankpin 24, like in the preferred embodiment, but is located on the portion of the outer surface 28 that is farthest from the piston 18 when the piston 18 is in the bottom dead center position, or is closest to the piston 18 when the piston is in the top dead center position. This location of the relieved area 40 reduces spalling on the outside of the crankpin 24.

Figure 3:
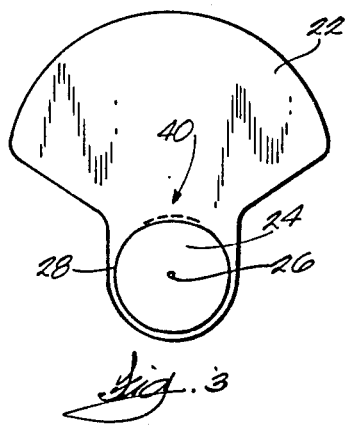
FIG. 3 is a view enlarged with respect to FIG. 1 and reduced with respect to FIG. 2 and showing an exaggerated relieved area on the crankpin.

In another alternative embodiment (not illustrated), the crankpin 24 can have relieved areas both in the location illustrated in FIG. 3 and in the location illustrated in FIG. 7. This would reduce spalling due to both inertia loading and combustion loading.

Various features of the invention are set forth in the following claims.

I claim:

1. An internal combustion engine comprising a cylinder, a piston slidably movable in said cylinder along an axis and relative to a bottom dead center position, a crankshaft including a crankpin having a longitudinal axis and a cylindrical outer surface, a connecting rod including a first end pivotally connected to said piston, and a second end having therein a cylindrical bore rotatably receiving said crankpin, said bore having a cylindrical inner surface radially spaced from said outer surface of said crankpin to define an annular space, one of said inner surface of said connecting rod and said outer surface of said crankpin including a relieved area forming a part of said annular space and intersected by a plane having therein said crankpin axis and said piston axis when said piston is in said bottom dead center position, and a plurality of roller bearings located in a circumferentially extending array in said annular space between said outer surface and said inner surface and with said relieved portion otherwise unoccupied.

2. An engine as set forth in claim 1 wherein said outer surface of said crankpin includes said relieved area.

3. An engine as set forth in claim 2 wherein said outer surface includes a portion which is closest to said piston when said piston is in said bottom dead center position, and wherein said relieved area is located on said portion of said outer surface.

4. An engine as set forth in claim 2 wherein said outer surface includes a portion which is farthest from said piston when said piston is in said bottom dead center position, and wherein said relieved area is located on said portion of said outer surface.

5. An engine as set forth in claim 1 wherein said inner surface of said connecting rod includes said relieved area.

6. An engine as set forth in claim 5 wherein said inner surface includes a portion which is located closest to said piston, and wherein said relieved area is located on said portion of said inner surface.

7. An engine as set forth in claim 1 wherein said relieved area has an arcuate extent of approximately 60 degrees.

8. An engine as set forth in claim 7 wherein said engine comprises approximately 18 roller bearings located between said inner surface and said outer surface.

9. An engine as set forth in claim 1 wherein said part of said annular space defined by said relieved area has a first radial dimension, and wherein the remainder of said annular space has a second radial dimension approximately 0.0002 inches less than said first radial dimension.

10. An internal combustion engine comprising a cylinder, a piston slidably movable in said cylinder along an axis and relative to a bottom dead center position, a crankshaft including a crankpin having a longitudinal axis and a generally cylindrical outer surface, a connecting rod including a first end pivotally connected to said piston, and a second end having therein a cylindrical bore rotatably receiving said crankpin, said bore having a generally cylindrical inner surface radially spaced from said outer surface to define an annular space between said inner and outer surfaces, said annular space including an arcuate portion intersected by a plane having therein said crankpin axis and said piston axis when said piston is in said bottom dead center position, said arcuate portion having a first radial dimension, and the remainder of said space having a second radial dimension less than said first radial dimension, and a plurality of roller bearings located in a circumferentially extending array in said annular space and with said relieved portion otherwise unoccupied.

11. An internal combustion engine as set forth in claim 10 wherein said annular space includes a portion which is closest to said piston when said piston is in said bottom dead center position, and wherein said arcuate portion is said closest portion.

12. An engine as set forth in claim 10 wherein said piston is also movable relative to a top dead center position, wherein said annular space includes a portion which is closest to said piston when said piston is in said top dead center position, and wherein said arcuate portion is said closest portion.

13. An engine as set forth in claim 10 wherein said arcuate portion is partially defined by a relieved area on said outer surface.

14. An engine as set forth in claim 10 wherein said arcuate portion is partially defined by a relieved area on said inner surface.

15. An engine as set forth in claim 10 wherein said arcuate portion has an arcuate extent of approximately 60 degrees.

16. An engine as set forth in claim 15 wherein said engine comprises approximately 18 roller bearings located in said annular space.

17. An engine as set forth in claim 10 wherein said second radial dimension is approximately 0.0002 inches less than said first radial dimension.

18. An internal combustion engine comprising a cylinder, a piston slidably movable in said cylinder relative to a bottom dead center position, a crankshaft including a crankpin having a cylindrical outer surface, said outer surface including a portion which is closest to said piston when said piston is in said bottom dead center position, and a relieved area located on said portion and having an arcuate extent of approximately 60 degrees, a connecting rod including a first end pivotally connected to said piston, and a second end having therein a cylindrical bore rotatably receiving said crankpin, said bore having a cylindrical inner surface, said inner and outer surfaces defining an annular space including an arcuate portion partially defined by said relieved area and having a first radial dimension, and the remainder of said space having a second radial dimension approximately 0.0002 inches less than said first radial dimension, and a plurality of roller bearings located in a circumferentially extending array in said annular space and with said relieved portion otherwise unoccupied.

19. An engine as set forth in claim 18 wherein said relieved area has an arcuate extent of approximately 60 degrees.

20. An engine as set forth in claim 19 wherein said engine comprises approximately 18 roller bearings located between said inner surface and said outer surface.

* * * * *